(12) United States Patent
Li et al.

(10) Patent No.: US 11,419,132 B2
(45) Date of Patent: Aug. 16, 2022

(54) NETWORK DEVICE AND METHOD FOR DATA TRANSMISSION OVER COMMON PUBLIC RADIO INTERFACE

(71) Applicant: Telefonaktiebolaget LM Ericsson (publ), Stockholm (SE)

(72) Inventors: Yanqiang Li, Beijing (CN); Huaisong Zhu, Beijing (CN); Ming Li, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 98 days.

(21) Appl. No.: 16/650,448

(22) PCT Filed: Nov. 6, 2017

(86) PCT No.: PCT/CN2017/109467
§ 371 (c)(1),
(2) Date: Mar. 25, 2020

(87) PCT Pub. No.: WO2019/084940
PCT Pub. Date: May 9, 2019

(65) Prior Publication Data
US 2020/0314874 A1 Oct. 1, 2020

(51) Int. Cl.
*H04W 72/12* (2009.01)
*H04W 4/80* (2018.01)
(Continued)

(52) U.S. Cl.
CPC ..... *H04W 72/1263* (2013.01); *H04L 27/2636* (2013.01); *H04W 4/80* (2018.02);
(Continued)

(58) Field of Classification Search
CPC .............. H04W 72/1263; H04W 4/80; H04W 72/0446; H04W 92/10; H04W 92/12;
(Continued)

(56) References Cited

U.S. PATENT DOCUMENTS

2005/0105534 A1* 5/2005 Osterling .............. H04W 92/12
370/395.43
2013/0051329 A1 2/2013 Take
(Continued)

FOREIGN PATENT DOCUMENTS

CN 103546412 A 1/2014
CN 104579479 A 4/2015
(Continued)

OTHER PUBLICATIONS

Author: Oliva et al. Title: An overview of the CPRI specification and its application to C-RAN based LTE scenarios, IEEE communications magazine Feb. 2016 (Year: 2016).*
(Continued)

*Primary Examiner* — Rina C Pancholi
(74) *Attorney, Agent, or Firm* — Christopher & Weisberg, P.A.

(57) ABSTRACT

The present disclosure provides a method in a network device for transmission of Narrow Band-Internet of Things (NB-IoT) data between a Radio Equipment Control (REC) node and a Radio Equipment (RE) node over Common Public Radio Interface (CPRI). The method comprises: transmitting the NB-IoT data from the REC node to the RE node or from the RE node to the REC node in a Control and Management (C&M) region of a CPRI frame. The NB-IoT data is frequency-domain data.

12 Claims, 3 Drawing Sheets

(51) Int. Cl.
  *H04L 27/26*   (2006.01)
  *H04W 72/04*   (2009.01)
  *H04W 92/10*   (2009.01)
  *H04W 92/12*   (2009.01)

(52) U.S. Cl.
  CPC ........ *H04W 72/0446* (2013.01); *H04W 92/10* (2013.01); *H04W 92/12* (2013.01)

(58) Field of Classification Search
  CPC ........... H04W 72/0406; H04W 88/085; H04W 88/12; H04W 88/08; H04L 27/2636
  See application file for complete search history.

(56) References Cited

U.S. PATENT DOCUMENTS

| | | | |
|---|---|---|---|
| 2015/0117277 A1* | 4/2015 | Liu | ............................ H04L 1/00 370/280 |
| 2017/0294994 A1 | 10/2017 | Shor et al. | |
| 2018/0139725 A1 | 5/2018 | Takeda et al. | |
| 2021/0289470 A1* | 9/2021 | Kumar | .................. H04L 5/0053 |

FOREIGN PATENT DOCUMENTS

| | | | |
|---|---|---|---|
| CN | 106413138 A | * | 2/2017 |
| CN | 108599892 A | * | 9/2018 |
| WO | 2006040653 A1 | | 4/2006 |
| WO | 2017078129 A1 | | 5/2017 |
| WO | 2017088911 A1 | | 6/2017 |

OTHER PUBLICATIONS

CPRI specification v6.1 Jul. 1, 2014 (Year: 2014).*
International Search Report and Written Opinion of the International Searching Authority for PCT International Application No. PCT/CN2017/109467 dated Jun. 27, 2018.
Extended European Search Report for European Patent Application No. 17930906.7 dated Oct. 1, 2020, 10 pages.
Ericsson et al., "Common Public Radio Interface (CPRI); Interface Specification," CPRI Specification V6.1, Jul. 1, 2014, 129 pages.

* cited by examiner

NETWORK DEVICE AND METHOD FOR DATA TRANSMISSION OVER COMMON PUBLIC RADIO INTERFACE

CROSS REFERENCE TO RELATED APPLICATION

This application is a 35 U.S.C. § 371 national stage application of PCT International Application No. PCT/CN2017/109467, filed on Nov. 6, 2017, the disclosure and content of which is incorporated herein by reference in its entirety.

TECHNICAL FIELD

The present disclosure relates to communication technology, and more particularly, to a network device and a method for transmission of Narrow Band-Internet of Things (NB-IoT) data over Common Public Radio Interface (CPRI).

BACKGROUND

Common Public Radio Interface (CPRI) is an interface between a Radio Equipment Control (REC) and a Radio Equipment (RE) in a radio base station. FIG. 1 is a schematic diagram showing a CPRI link between an REC (master port) and an RE (slave port). The interface/link supports the following types of information flows:

IQ Data: User plane information in the form of in-phase and quadrature modulation data (digital baseband signals).
Synchronization: Synchronization data used for frame and time alignment.
L1 Inband Protocol: Signalling information that is related to the link and is directly transported by the physical layer.
C&M data: Control and management information exchanged between the control and management entities within the REC and the RE.
Protocol Extensions: This information flow is reserved for future protocol extensions.
Vendor Specific Information: This information flow is reserved for vendor specific information.

User plane data is transported in the form of IQ data. Several IQ data flows are sent via one physical CPRI link. Each IQ data flow reflects the data of one antenna for one carrier, referred to as antenna-carrier (AxC).

Details of CPRI can be found in *CPRI Specification V6.1, Common Public Radio Interface (CPRI); Interface Specification,* 2014-07-01, which is incorporated herein by reference in its entirety.

SUMMARY

The summary is provided to introduce a selection of concepts in a simplified form that are further described below in detailed description. This summary is not intended to identify key features or essential features of the claimed subject matter, nor is it intended to be used to limit the scope of the claimed subject matter.

It is an object of the present disclosure to provide a network device and a method for transmission of NB-IoT data over CPRI, capable of achieving improved bandwidth efficiency.

According to a first aspect of the present disclosure, method in a network device for transmission of Narrow Band-Internet of Things (NB-IoT) data between a Radio Equipment Control (REC) node and a Radio Equipment (RE) node over Common Public Radio Interface (CPRI) is provided. The method includes transmitting the NB-IoT data from the REC node to the RE node or from the RE node to the REC node in a Control and Management (C&M) region of a CPRI frame. The NB-IoT data is frequency-domain data.

In an embodiment, the operation of transmitting the NB-IoT data from the REC node to the RE node includes mapping, at the REC node, the NB-IoT data into the C&M region of the CPRI frame; and transmitting the CPRI frame from the REC node to the RE node.

In an embodiment, the method further includes extracting, at the RE node, the NB-IoT data from the CPRI frame; and transforming the NB-IoT data into time-domain data, by means of Fast Fourier Transform (FFT) for transmission over an air interface.

In an embodiment, the method further includes, prior to the operation of transmitting the NB-IoT data from the RE node to the REC node: receiving time-domain data associated with an NB-IoT traffic; and transforming the time-domain data into the NB-IoT data, by means of Inverse Fast Fourier Transform (IFFT).

In an embodiment, the operation of transmitting the NB-IoT data from the RE node to the REC node includes: mapping, at the RE node, the NB-IoT data into the C&M region of the CPRI frame; and transmitting the CPRI frame from the RE node to the REC node.

In an embodiment, the method further includes: extracting, at the REC node, the NB-IoT data from the CPRI frame.

In an embodiment, the C&M region includes one or more of: a reserved C&M region; a vendor specific C&M region; and a fast C&M region.

According to a second aspect of the present disclosure, a network device is provided. The network device includes a Radio Equipment Control (REC) node and a Radio Equipment (RE) node connected with each other via a Common Public Radio Interface (CPRI). One of the REC node and the RE node is configured to transmit Narrow Band-Internet of Things (NB-IoT) data to the other one of the REC node and the RE node in a Control and Management (C&M) region of a CPRI frame. The NB-IoT data is frequency-domain data.

In an embodiment, the REC node is configured to: map the NB-IoT data into the C&M region of the CPRI frame; and transmit the CPRI frame the RE node.

In an embodiment, the RE node is configured to: extract the NB-IoT data from the CPRI frame; and transform the NB-IoT data into time-domain data, by means of Fast Fourier Transform (FFT) for transmission over an air interface.

In an embodiment, the RE node is configured to: receive time-domain data associated with an NB-IoT traffic; and transform the time-domain data into the NB-IoT data, by means of Inverse Fast Fourier Transform (IFFT).

In an embodiment, the RE node is configured to: map the NB-IoT data into the C&M region of the CPRI frame; and transmit the CPRI frame to the REC node.

In an embodiment, the REC node is configured to: extract the NB-IoT data from the CPRI frame.

In an embodiment, the C&M region includes one or more of: a reserved C&M region; a vendor specific C&M region; and a fast C&M region.

With the embodiments of the present disclosure, the REC can transmit and/or receive NB-IoT data, as frequency-domain data, to and/or from the RE via CPRI in a C&M region of a CPRI frame. In this way, a NB-IoT carrier only occupies a part of the C&M region, instead of an entire AxC, which leads to improved bandwidth efficiency.

BRIEF DESCRIPTION OF THE DRAWINGS

The above and other objects, features and advantages will be more apparent from the following description of embodiments with reference to the figures, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
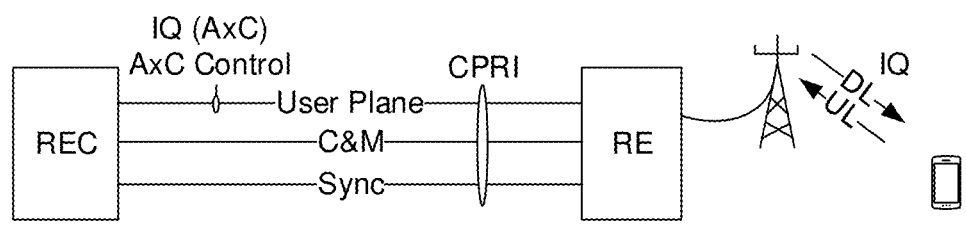
FIG. 1 is a schematic diagram showing a CPRI link.

The embodiments of the disclosure will be detailed below with reference to the drawings. It should be appreciated that the following embodiments are illustrative only, rather than limiting the scope of the disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In the 5th Generation (5G) wireless communication or Machine Type Communication (MTC) which adopts Orthogonal Frequency Division Multiplexing (OFDM) technique, a base station performs signal processing in frequency domain. For example, an REC applies Fast Fourier Transform (FFT) to transform frequency-domain data into time-domain data (IQ data) and transmits the IQ data to an RE for downlink transmission to a terminal device. In uplink reception, on the other hand, the RE transmits IQ data to the REC, which then applies Inverse Fast Fourier Transform (IFFT) to transform the IQ data into frequency-domain data for signal processing.

Narrow Band-Internet of Things (NB-IoT) typically has a small amount of data. When transmitted over CPRI, NB-IoT data having a carrier bandwidth of approximately 200 KHz will occupy one AxC, which may otherwise be used for carrying e.g., Long Term Evolution (LTE) user plane data having a carrier bandwidth of 20 MHz. This is very inefficient in bandwidth utilization. Particularly when a chain topology, tree topology or ring topology of CPRI (referring to *CPRI Specification V6.1*) is adopted, there may be even more CPRI capacities occupied by such narrow-band traffic and accordingly less AxCs that can be used for other (e.g., broadband) traffic.

There is a need for an improved solution for transmission of NB-IoT data over CPRI.

Figure 2:
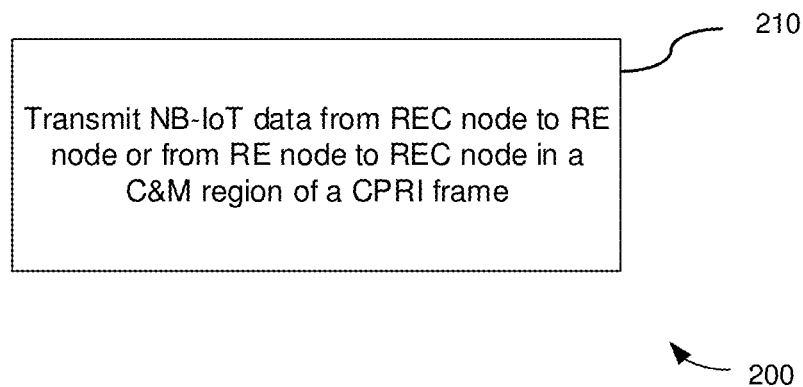
FIG. 2 is a flowchart illustrating a method for transmission of NB-IoT data over CPRI according to an embodiment of the present disclosure.

FIG. 2 is a flowchart illustrating a method 200 for transmission of NB-IoT data over CPRI according to an embodiment of the present disclosure. The method can be performed at a network device which includes an REC node and an RE node connected to each other via CPRI.

At block 210, NB-IoT data is transmitted from the REC node to the RE node, or from the RE node to the REC node, in a Control and Management (C&M) region of a CPRI frame. Here, the NB-IoT data can be frequency-domain data.

When the NB-IoT data is transmitted from the REC node to the RE node in the block 210, the REC node can map the NB-IoT data into the C&M region of the CPRI frame, and transmit the CPRI frame to the RE node. Accordingly, the RE node can extract the NB-IoT data from the CPRI frame, and transform the NB-IoT data into time-domain data, by means of Fast Fourier Transform (FFT) for transmission over an air interface, e.g., to a terminal device in downlink.

On the other hand, when the NB-IoT data is transmitted from the RE node to the REC node, the RE node can map the NB-IoT data into the C&M region of the CPRI frame, and transmit the CPRI frame to the REC node. Accordingly, the REC node can extract the NB-IoT data from the CPRI frame. In an example, before transmitting the NB-IoT data to the REC node, the RE node can receive time-domain data associated with an NB-IoT traffic, and transforming the time-domain data into the NB-IoT data, by means of Inverse Fast Fourier Transform (IFFT).

Figure 3:
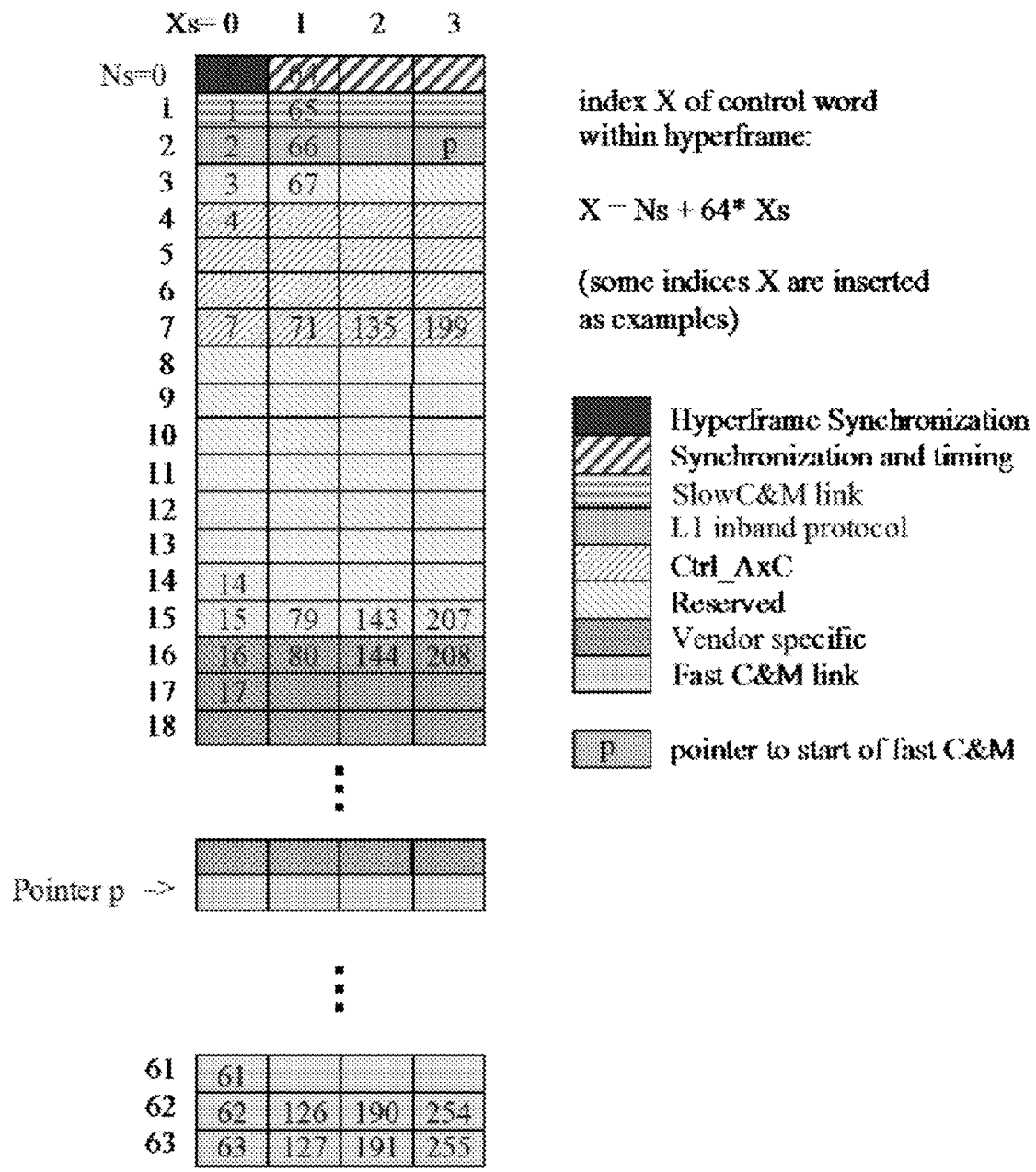
FIG. 3 is a schematic diagram showing a structure of a CPRI hyper-frame.

FIG. 3 is a schematic diagram showing a structure of a CPRI hyper-frame. A CPRI frame typically includes 150 hyper-frames each including 256 basic frames. For details of the CPRI frame and hyper-frame structures, reference can be made to Section 4.2.7.3 and Section 4.2.7.4 of *CPRI Specification V6.1*. In an example, the C&M region in which the NB-IoT data is be transmitted from the REC node to the RE node, or from the RE node to the REC node, may include one or more of: a reserved C&M region, a vendor specific C&M region and a fast C&M region, which are shown FIG. 3 as "Reserved", "Vendor specific" and "Fast C&M link", respectively.

Transmitting the NB-IoT data in the C&M region will inevitably introduce a CPRI transmission delay. However, since the NB-IoT data typically has a delay on the order of milliseconds or 10 milliseconds, the introduced CPRI transmission delay, which is on the order to microseconds, will not degrade the overall performance of the NB-IoT transmission.

For example, in a 10.1376 Gbps CPRI link, a C&M channel occupies a bandwidth of 614.4 Mbps in the total CPRI line rate. In a 9.8 Gbps CPRI link, a C&M channel has a bandwidth of 491.52 Mbps. The C&M channel can provide an enough bandwidth for transmission of the NB-IOT data.

When the NB-IoT data is transmitted as time-domain data, it has a bandwidth of 200K samples per second/NB cell (defined by Nyquist sampling principle)*22 (bit/sample)=4.4 Mbps.

When the NB-IoT data is transmitted as frequency-domain data (i.e., by moving the FFT/IFFT functionality from the REC to the RE), it has a bandwidth of 12 Resource Elements/NB cell*14 symbols/per 1 ms*1000*22 bits per sample=3.7 Mbps. Moreover, if the modulation functionality is moved from the REC to the RE, in addition to the FFT/IFFT functionality, the NB-IoT data will have a bandwidth of 12 Resource Elements/NB cell*14 symbols/per 1 ms*1000*2 bits per sample (only QPSK/BPSK supported)=0.34 Mbps. Hence, by moving the FFT/IFFT functionality from the REC to the RE, the NB-IoT data can be transmitted as frequency-domain data, which has a smaller amount of data, requires a smaller bandwidth and has a much lower requirement on real-time performance.

For a 9.8304 Gbps CPRI link, assuming that the bandwidth of the "Reserved" region in the C&M channel is 8 words, its bit rate is 128 bits*8*4 words*150 hyperframes*100 frames=61.44 Mbps. The "Vendor specific" and the "Fast C&M link" regions have a total bandwidth of 368.64 Mbps. Thus, these regions are fully capable of carrying the NB-IoT data.

Figure 4:
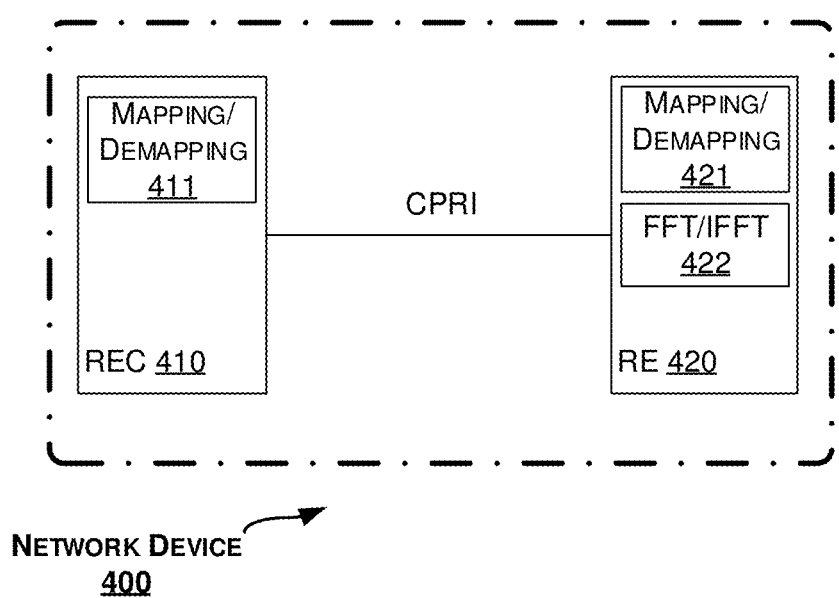
FIG. 4 is a block diagram of a network device according to an embodiment of the present disclosure.

FIG. 4 is a block diagram of a network device 400 according to an embodiment of the present disclosure. As shown, the network device 400 includes an REC node 410 and an RE node 420 connected to each other via CPRI. The REC node can be configured to transmit NB-IoT data to the RE node in a C&M region of a CPRI frame. Additionally or alternatively, the RE node can be configured to transmit NB-IoT data to the REC node in a C&M region of a CPRI frame. Here, the NB-IoT data is frequency-domain data.

In an example, the REC node 410 (or in particular a mapping/demapping unit 411) is configured to map the NB-IoT data into the C&M region of the CPRI frame. For example, the NB-IoT data can be one or more NB-IoT data packets received by the mapping/demapping unit 411 from an NB-IoT Layer 2 (L2)/Layer 1 (L1) processing unit. Then, the REC node 410 transmits the CPRI frame the RE node 420. Accordingly, the RE node 420 (or in particular a mapping/demapping unit 421) is configured to extract the NB-IoT data from the CPRI frame. Further, the RE node 420 (or in particular an FFT/IFFT unit 422) is configured to transform the NB-IoT data into time-domain data, by means of FFT, for transmission over an air interface. In example, the time-domain data is sent to an NB-IoT Digital Front-End (DFE) unit for downlink transmission to a terminal device.

On the other hand, the RE node 420 is configured to receive time-domain data associated with an NB-IoT traffic. For example, the time-domain data can be IQ data and forwarded from the NB-IoT DFE unit to the FFT/IFFT unit 422. Further, the RE node 420 (or in particular the FFT/IFFT unit 422) is configured to transform the time-domain data into the NB-IoT data, by means of IFFT. Then, the RE node 420 (or in particular the mapping/demapping unit 421) is configured to map the NB-IoT data into the C&M region of the CPRI frame. The RE node 420 transmits the CPRI frame to the REC node 410. Accordingly, the REC node 410 (or in particular the mapping/demapping unit 411) is configured to extract the NB-IoT data from the CPRI frame. The mapping/demapping unit 411 can then send the NB-IoT data to NB-IoT L2/L1 processing unit.

In an example, the C&M region in which the NB-IoT data is be transmitted from the REC node to the RE node, or from the RE node to the REC node, may include one or more of: a reserved C&M region, a vendor specific C&M region and a fast C&M region, as shown FIG. 3.

The above units 411, 421 and 422 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for transmission of Narrow Band-Internet of Things, NB-IoT, data between a Radio Equipment Control, REC, node and a Radio Equipment, RE, node over Common Public Radio Interface, CPRI, the method comprising:
    transmitting the NB-IoT data as frequency-domain data from the REC node to the RE node or from the RE node to the REC node in a Control and Management, C&M, region of a CPRI frame, the NB-IoT data one of having been received and to be transmitted as time-domain data over an air interface with a terminal device and the C&M region comprising:
        a reserved C&M region;
        a vendor specific C&M region; and
        a fast C&M region.

2. The method of claim 1, wherein said transmitting the NB-IoT data from the REC node to the RE node comprises:
    mapping, at the REC node, the NB-IoT data into the C&M region of the CPRI frame; and
    transmitting the CPRI frame from the REC node to the RE node.

3. The method of claim 2, further comprising:
    extracting, at the RE node, the NB-IoT data from the CPRI frame; and
    transforming the NB-IoT data into time-domain data, by means of Fast Fourier Transform, FFT, for transmission over an air interface.

4. The of claim 1, further comprising, prior to said transmitting the NB-IoT data from the RE node to the REC node:
    receiving time-domain data associated with an NB-IoT traffic; and
    transforming the time-domain data into the NB-IoT data, by means of Inverse Fast Fourier Transform, IFFT.

5. The of claim 4, wherein said transmitting the NB-IoT data from the RE node to the REC node comprises:
    mapping, at the RE node, the NB-IoT data into the C&M region of the CPRI frame; and
    transmitting the CPRI frame from the RE node to the REC node.

6. The method of claim 4, further comprising:
    extracting, at the REC node, the NB-IoT data from the CPRI frame.

7. A network device comprising a Radio Equipment Control, REC, node and a Radio Equipment, RE, node connected with each other via a Common Public Radio Interface, CPRI, wherein one of the REC node and the RE node is configured to transmit Narrow Band-Internet of Things, NB-IoT, data as frequency-domain data to the other one of the REC node and the RE node in a Control and Management, C&M, region of a CPRI frame, the NB-IoT data one of having been received and to be transmitted as time-domain data over an air interface with a terminal device and the C&M region comprising:
    a reserved C&M region;
    a vendor specific C&M region; and
    a fast C&M region.

8. The network device of claim 7, wherein the REC node is configured to:
    map the NB-IoT data into the C&M region of the CPRI frame; and
    transmit the CPRI frame to the RE node.

9. The network device of claim 8, wherein the RE node is configured to:
- extract the NB-IoT data from the CPRI frame; and
- transform the NB-IoT data into time-domain data, by means of Fast Fourier Transform, FFT, for transmission over an air interface.

10. The network device of claim 7, wherein the RE node is configured to:
- receive time-domain data associated with an NB-IoT traffic; and
- transform the time-domain data into the NB-IoT data, by means of Inverse Fast Fourier Transform, IFFT.

11. The network device of claim 10, wherein the RE node is configured to:
- map the NB-IoT data into the C&M region of the CPRI frame; and
- transmit the CPRI frame to the REC node.

12. The network device of claim 10, wherein the REC node is configured to:
- extract the NB-IoT data from the CPRI frame.

* * * * *